US005816467A

United States Patent [19]

Dunn

[11] Patent Number: 5,816,467

[45] Date of Patent: Oct. 6, 1998

[54] APPARATUS FOR APPLYING FASTENERS TO PICTURE FRAMES

[75] Inventor: Brian J. Dunn, Oakland, Calif.

[73] Assignee: Bullseye Fastener Development, Inc., Oakland, Calif.

[21] Appl. No.: 767,511

[22] Filed: Dec. 16, 1996

Related U.S. Application Data

[63] Continuation-in-part of Ser. No. 345,639, Nov. 28, 1994, Pat. No. 5,605,270.

[51] Int. Cl.[6] ................................ B23Q 3/00; B27F 7/09; B27F 7/34

[52] U.S. Cl. .................................. 227/3; 227/39; 227/45; 227/140; 227/145; 227/150; 227/152

[58] Field of Search ................................. 227/2, 3, 4, 39, 227/40, 45, 48, 140, 144, 145, 148, 150, 152, 153, 154, 155

[56] References Cited

U.S. PATENT DOCUMENTS

| | | | |
|---|---|---|---|
| 3,140,493 | 7/1964 | Ennis | 227/145 |
| 4,241,651 | 12/1980 | Castillo et al. | 227/145 |
| 4,392,599 | 7/1983 | Russell | 227/152 |
| 4,623,083 | 11/1986 | Pagano | 227/154 |
| 4,763,825 | 8/1988 | Albin | 227/142 |
| 4,830,257 | 5/1989 | Lin | 227/152 |
| 4,876,787 | 10/1989 | Ditty et al. | 227/152 |

*Primary Examiner*—Scott A. Smith
*Attorney, Agent, or Firm*—Harris Zimmerman

[57] ABSTRACT

An apparatus for final assembly of framed artwork includes a conveyor for translating a plurality of art frames past a robot arm assembly. A fastener driver module is supported by the robot arm assembly, the module including a support plate and a magazine secured to the support plate by a pivot assembly at the upper end of the magazine, with the freely pivoting lower end of the magazine depending from the support plate. A pneumatic actuator extends laterally from the support plate to rotate the lower end of the magazine to impinge on the art frame, and another pneumatic actuator supported on the magazine is coupled through a lever arrangement to a driver blade extending through the lower end of the magazine. The driver blade engages the lowermost fastener in the magazine and ejects it forcefully, driving it into the interior opening of the frame on the table. A computer control system is connected to the robot arm assembly to move the fastener driver module to engage each art frame passing thereby, and to drive fasteners into the rails of each frame and secure the artwork therein. A speed sensor coupled to the conveyor generates a speed signal that is received by the computer control system, whereby the robot arm may be driven in translational synchronism with each passing art frame.

7 Claims, 8 Drawing Sheets

APPARATUS FOR APPLYING FASTENERS TO PICTURE FRAMES

REFERENCE TO RELATED APPLICATION

This application is a continuation-in-part of application Ser. No. 08/345,639, filed Nov. 28, 1994, now U.S. Pat. No. 5,605,270, issued Feb. 25, 1997 to the present inventor, Brian Dunn.

BACKGROUND OF THE INVENTION

This invention generally relates to devices for applying fasteners, and more specifically to an apparatus for automatically driving a plurality of fasteners into a picture frame to secure the glazing, or artwork, and the backing in the frame.

In the manufacture of framed artwork, such as photographs, prints and paintings and the like, the typical practice is to place a transparent glass or plastic plate within a flange formed in the frame opening, place the artwork or other image-bearing flat article on the transparent plate, and place a backing member atop the artwork. To secure these layers in place within the frame, a plurality of fasteners are driven into the interior edge of the frame, so that the tails of the fasteners extend to impinge on the back surface of the backing member. The fasteners, which may comprise glazier points, staples, tabs, or brads are generally driven by hand, using either manual or power-assisted tools.

Power-assisted tools, which may be pneumatically or electrically operated, are typically configured with a moving armature or piston that translates linearly to drive a fastener into the interior frame edge. The armature or piston requires a minimum length and travel path, and these factors determine that the tool must

SUMMARY OF THE INVENTION

The present invention generally comprises a method and apparatus for final assembly of framed artwork or wood frames by installation of fasteners to secure a backing member which retains the artwork and glazing within the frame.

The apparatus of the invention includes a quartet of vertical supports disposed at the vertices of a rectangular layout. The vertical supports may be formed of tubular rectangular beams. A base plate is supported horizontally by the vertical supports, and a plurality of posts extend upwardly from the base plate. A table is secured to the posts in vertically translatable fashion, and a first pneumatic actuator is secured between the base plate and the table to selectively raise and lower the table. The table is provided with a first fence extending upwardly therefrom to position a picture frame upon the table. A second fence is disposed orthogonally to the first fence, and includes an ejector bar secured to a second pneumatic actuator. The two fences provide accurate positioning of a frame on the table, and the ejector bar discharges the frame when the final assembly process is completed, as explained below.

A pair of tubular rectangular beams extend longitudinally in parallel, spaced apart relationship superjacent to the table, and are secured at opposed ends to the upper ends of respective vertical supports. Another pair of tubular rectangular beams extend laterally in parallel, spaced apart relationship superjacent to the table, and are oriented orthogonally to the longitudinal beams. Clamping sleeves secured to the ends of the lateral beams engage the longitudinal beams, so that the lateral beams may be slidably positioned along the longitudinal beams. The tubular rectangular beams that comprise the vertical supports and longitudinal have a minimum length on the order of several inches. For small frames, the tool length may interfere with or prevent installing fasteners effectively within the interior opening. Large frames may require twelve or more fasteners to secure the backing within the opening, and the manual effort required to place and actuate the fastener tool multiple times for each frame results in a labor cost that cannot be reduced or avoided.

Moreover, in a high volume manufacturing setting, the manual movements involved in using the same tool to perform a task repetitively for hundreds of frames may cause the tool operator to experience extreme fatigue and repetitive stress injuries such as carpal tunnel syndrome as well as other neuromuscular disorders. The result may be personal difficulties for the tool operator and financial liabilities for the employer.

There is no tool or apparatus available in the art which combines the attributes of alleviating operator stress effects, reducing labor costs involved in installing multiple fasteners in each frame, and installing fasteners in small frame openings. and lateral beams all include interior spaces that are sealed in pressure-tight fashion to form a reservoir for a pneumatic air supply. Air hose connectors join the interior spaces of all the tubular beams to a source of air pressure to supply all the pneumatic actuators enumerated herein.

The apparatus further includes a plurality of modules for installing tabs or like fasteners in a picture frame supported on the table. Each module includes a support plate having a dogleg cutout which is adapted to receive one of the longitudinal or lateral beams, and an adjacent clamp to secure the support plate at any point along the beam. A magazine is secured to the support plate by a pivot assembly at the upper end of the magazine, with the freely pivoting lower end of the magazine depending from the support plate. Each module further contains a third pneumatic actuator extending laterally between the support plate and the pivoting lower end of the magazine. An arm extends obliquely downwardly from each support plate, and terminates in an anvil disposed in spaced apart opposition to the lower end of the magazine. The third pneumatic actuator is activated to rotate the lower end of the magazine toward the adjacent anvil, urging the lower end of the magazine to impinge on the interior surface of the opening in the frame and clamping the frame against the anvil.

The magazine contains a large plurality of fasteners in a vertically stacked column, and a spring feed arrangement to urge the column downwardly. A driver blade extends through the lower end of the magazine, and is coupled through a lever arrangement to a fourth pneumatic actuator supported on the magazine. Activation of the fourth pneumatic actuator operates the lever arrangement to translate the driver blade laterally. The driver blade engages the lowermost fastener in the magazine and ejects it forcefully, driving it into the surface of the interior opening of the frame on the table. After the fourth pneumatic actuator is deactivated , the third actuator is deactivated to release the frame. Thereafter, the first actuator is deactivated to lower the table, and the ejector bar pushes the frame from the table, and a new frame is placed on the table to reiterate the process.

All of the actuators may be connected to air supply nipples located in the longitudinal and lateral beams of the frame. The module actuators fire generally simultaneously, and the air pressure reservoir constituted by the interior spaces of the beams prevents malfunction of the actuators due to pressure drawdown.

The modules located superjacently to the positioning fences employ the fences as anvils, so that the arms and anvils of those modules are removed.

The method of the invention includes the steps of placing the frame on the table (either manually or by conveyor) abutting the two positioning fences, raising the table so that the frame sides are disposed between the fences or anvils and the lower ends of the magazines, activating the third actuators to clamp the frame, activating the fourth actuators to drive the fasteners into the frame, sequentially deactivating the actuators to release the frame, and ejecting the finished frame from the table onto a slide or similar receiving device.

In a further embodiment of the invention, a plurality of picture frames are supported on a conveyor belt and translated serially past a fastener applying station. The station includes a robot arm assembly that is capable of translation in a horizontal plane (nominally, X and Y directions) and supports an motive assembly that provides translation in and rotation about the Z axis. A module for installing tabs or like fasteners as described above is supported by the motive assembly, whereby the single module may be moved by the robot arm assembly to engage the frames on the conveyor belt as they pass the fastener applying station.

The robot arm is connected to a computer control system, which is also connected to a speed sensor coupled to the conveyor belt. The computer control system is programmed to move the robot arm so that the fastener module engages each frame as it passes, drives the fasteners into the rails of each frame to secure the artwork therein, and move to engage the next frame presented by the conveyor, all without requiring a change in translational speed of the conveyor or frames thereon. The frames may be disposed in abutting relationship along the conveyor, and guide rails are disposed on either side of the conveyor at the fastener applying station, so that the reaction force applied by the fastener module to each frame is absorbed by the guide rails and the inertial mass and friction of the frames disposed upstream and downstream of the fastener applying station.

DESCRIPTION OF THE PREFERRED EMBODIMENT

Figure 1:
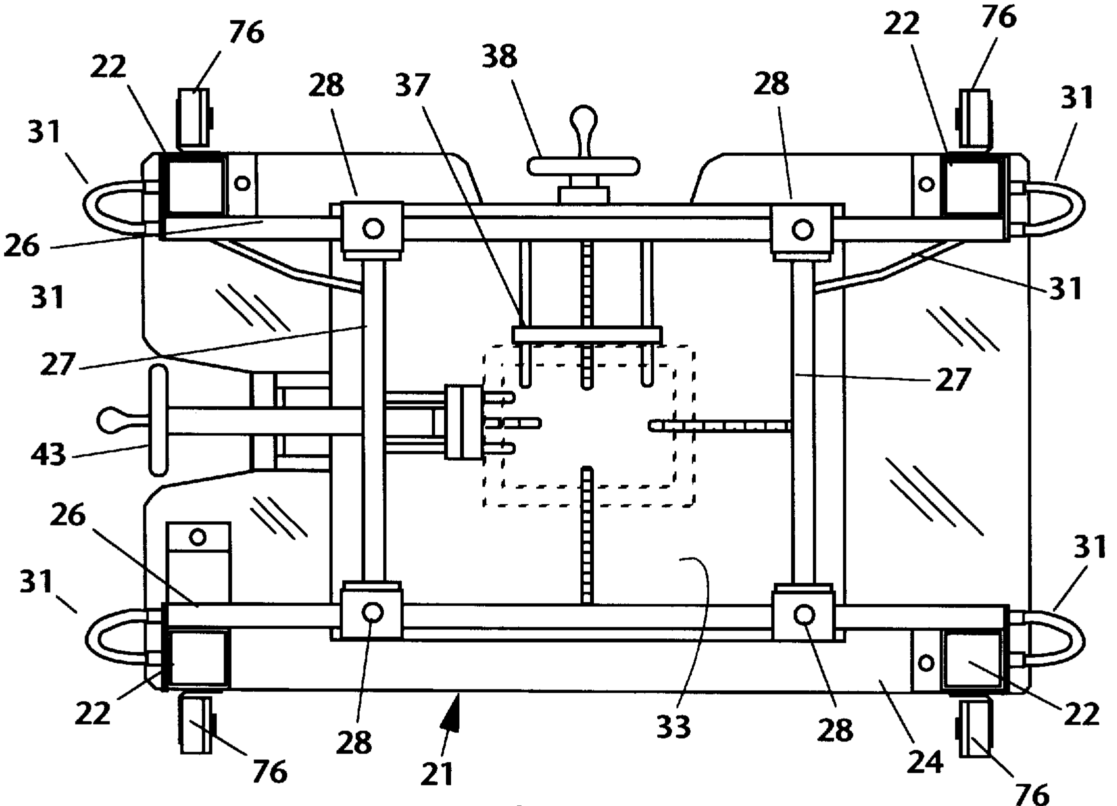
FIG. 1 is a plan view of the frame portion of the apparatus of the invention for placing fasteners in the interior surface of a picture frame to secure the glazing, artwork, and backing within the frame.

The present invention generally comprises a method and apparatus for final assembly of framed artwork by installation of fasteners to secure a backing member which retains the artwork and glazing within the frame. With regard to FIGS. 1 and 2, the apparatus includes a structure 21 for supporting a picture frame during the final assembly process. The structure 21 is comprised of four vertical supports 22 disposed in a rectangular array, each having a pad 23 for stable ground engagement. A base plate 24 extends horizontally between the vertical supports 22 and is secured rigidly thereto. A pair of tubular rectangular beams 26 extend longitudinally in parallel, spaced apart relationship superjacent to the base plate 24, and are secured at opposed ends to the upper ends of respective vertical supports 22. Another pair of tubular rectangular beams 27 extend laterally in parallel, spaced apart relationship superjacent to the base plate 24, and are oriented orthogonally to the longitudinal beams 26. Sleeves 28 secured to the ends of the lateral beams 27 engage the longitudinal beams in slidable fashion, so that the lateral beams may be slidably positioned along the longitudinal beams. A plurality of clamping devices 29 are provided, each associated with one of the sleeves 28, so that each lateral beam 27 may be secured at any selected position along the longitudinal beams 26.

The vertical supports 22 and longitudinal and lateral beams 26 and 27 are comprised of tubular rectangular beams that all include interior spaces sealed in pressure-tight fashion. Air hose connectors 31 join the interior spaces of all the tubular beams to form an air pressure reservoir which is connected to a source of air pressure to supply all the pneumatic actuators enumerated herein.

Extending upwardly from the base plate 24 are four posts 32 which are spaced inwardly from the vertical supports 22. A table 33 includes holes extending through the corners thereof to engage the posts 32 in slidable engagement. A pneumatic actuator 36 is secured to the base plate 24 and disposed to engage the center of the table, so that the actuator 36 may raise and lower the table 33 within limits established by adjustable upper stops 34 on the posts 32. A rear positioning fence 37 is slidably secured to the table 33, and selectively adjusted by a screw jack assembly 38. A side positioning fence assembly 39 includes a side fence 41 secured to the end of a pneumatic actuator 42. The fence 39 and actuator 42 are supported by a screw jack assembly 43, so that the fence 41 may position a picture frame on the table prior to final assembly, and the actuator 42 may be activated to eject the finished frame from the table subsequent to final assembly.

Figure 3:
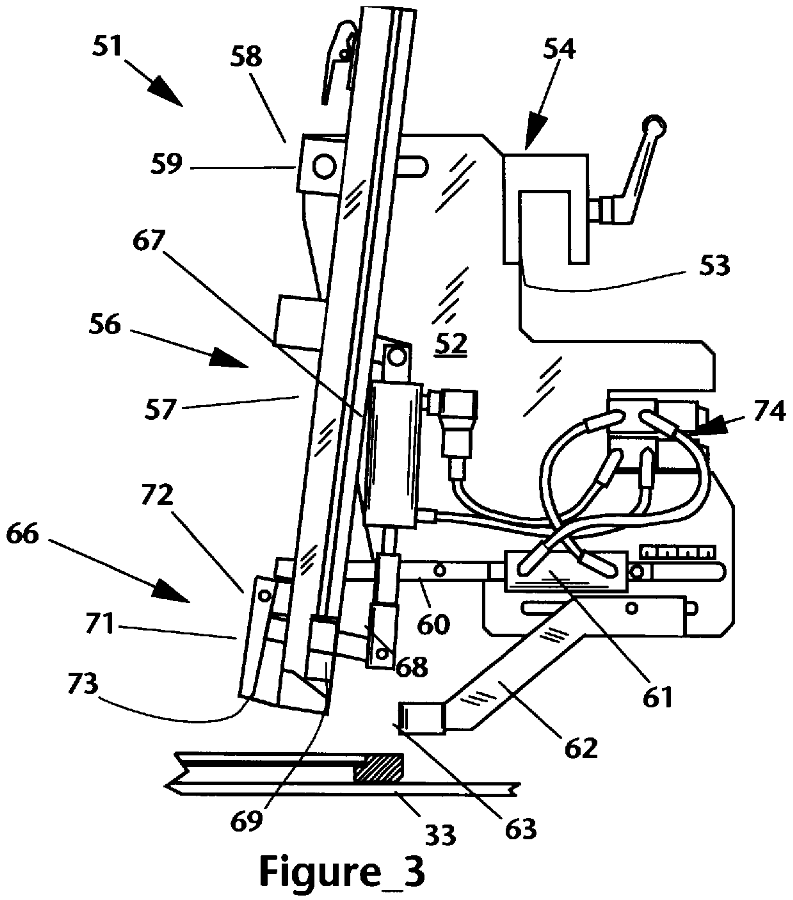
FIG. 3 is a plan elevation of a module of the invention for storing and driving fasteners into a picture frame, shown in the quiescent position.

The invention also includes a plurality of modules 51 for storing and driving tabs or similar fasteners into the interior surface of the opening of a picture frame to retain the backing member in the opening and secure the glazing and artwork in the frame. With reference to FIG. 3, each module 51 is comprised of a panel 52 adapted to be vertically disposed. A dogleg cutout 53 is formed in one edge of the panel 52 and dimensioned to accept one of the longitudinal or lateral beams 26 or 27, whereby the module 51 may be supported in suspended relationship on a selected beam 26 or 27. A clamp 54 is disposed astride the interior end of the cutout 53 to selectively secure the module at any desired position along the lateral or longitudinal beams. A magazine assembly 56 includes a magazine 57 for storing a large plurality of fasteners. Extending from the magazine 57 is a journal 58 for pivotally engaging a shaft 59 protruding from the panel 52, so that the magazine assembly is pivotally secured to the shaft 59 and generally depending therefrom. A pneumatic actuator 61 is secured to a lower portion of the panel 52, with the armature 60 thereof extending laterally and secured to a lower portion of the magazine assembly 56. An arm 62 extends obliquely downwardly from the lower end of the panel 52 and terminates in an anvil 63. The actuator 61 is operable to rotate the lower end of the magazine toward and away from the anvil 63, so that a picture frame may be clamped therebetween, as will be described below. The anvil arm 62 and the actuator 61 are adjustably positionable in a lateral direction on the panel 52 to accommodate frames of varying width dimensions.

Joined to a lower portion of the magazine assembly 56 is a fastener driver assembly 66. The assembly 66 includes a pneumatic actuator 67 secured to the magazine 57, with the armature 68 secured to a transverse lever 69. A drive lever 71 is pivotally secured at its upper end to a pin 72, and the lower end of the drive lever supports a fastener driver blade 73. The transverse lever 69 is rigidly secured to an upper portion of the drive lever 71, so that retraction of the armature 68 rotates the drive lever 71 toward the lower end of the magazine. The drive lever in turn causes the driver blade to engage the lowermost fastener in the magazine and drive that fastener forcefully toward the anvil 63, whereby the fastener is deeply embedded in the interior surface of the frame.

Figure 2:
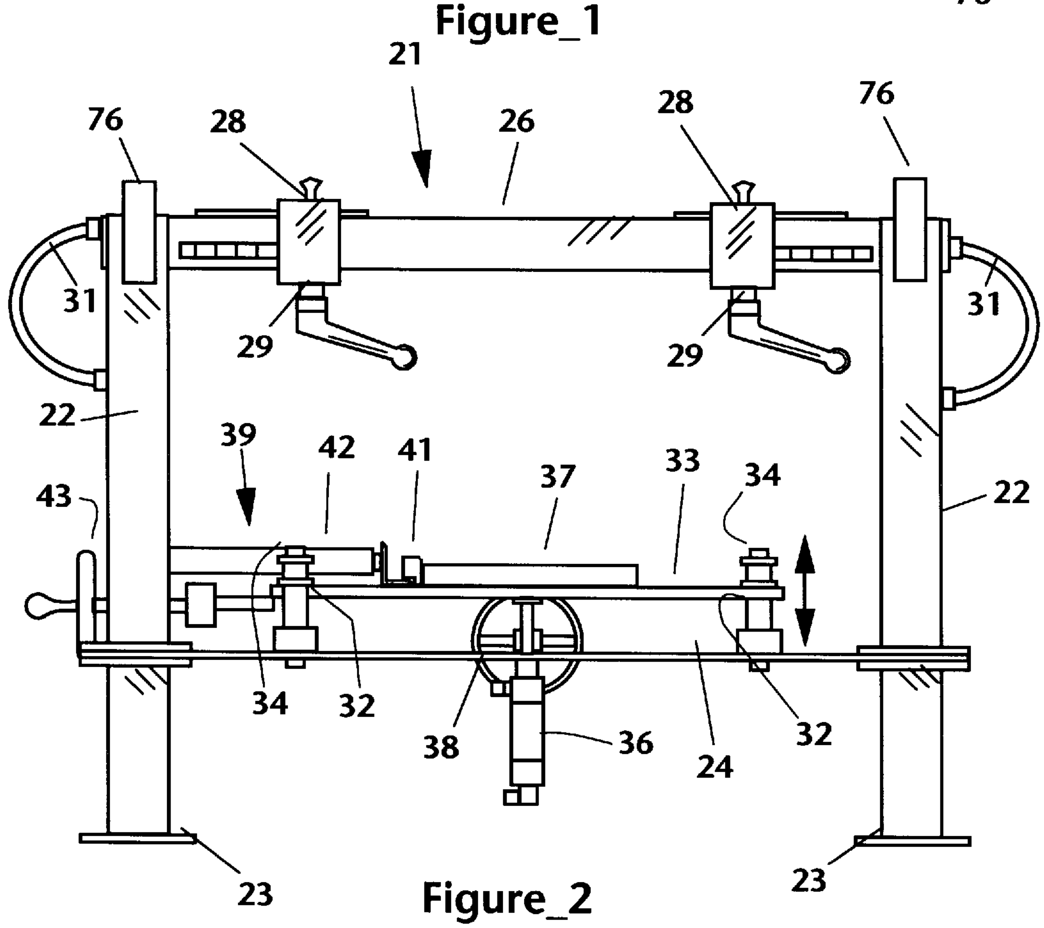
FIG. 2 is a front elevation of the apparatus depicted in FIG. 1.

A pneumatic relay 74 is supported on the panel 52 to distribute air pressure to the pneumatic actuators 61 and 67. The relay 74 is connected through an air hose (not shown) to one of several air hose connectors provided in the longitudinal and lateral beams 26 and 27. Operating power and signal power is provided to the relay 74 by junction boxes 76 supported on the structure 21 (FIGS. 1 and 2). It may be noted that each module 51 is self-contained and may be disposed at any location on the longitudinal and lateral beams 26 and 27, connected to air pressure and electrical and signal power, and operated automatically to apply fasteners to picture frames. All pneumatic actuators are double-acting cylinders, unless otherwise noted, except actuator 67, which may also be spring-assisted.

Figure 8:
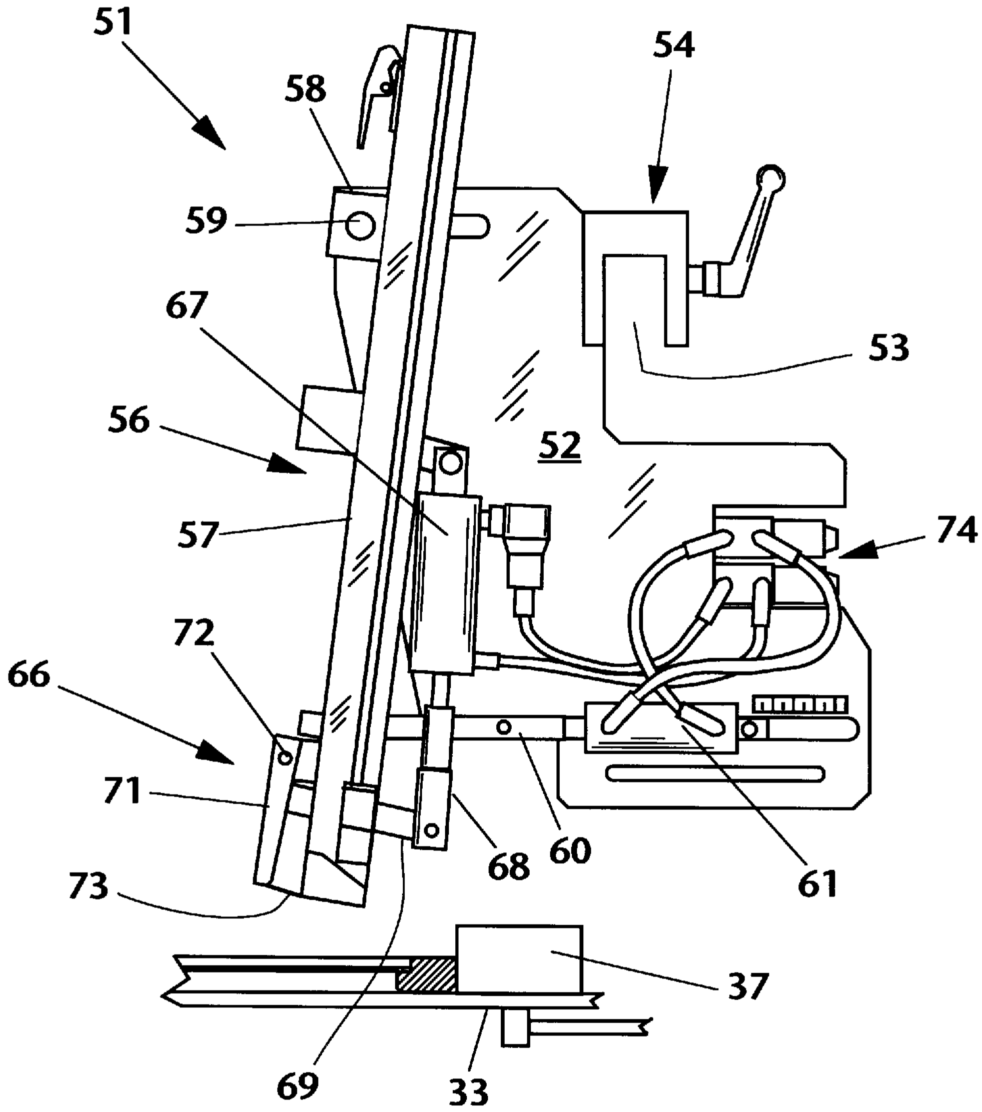
FIG. 8 is a plan elevation of a modified module of the invention for use in conjunction with a positioning fence of the apparatus.

The module 51 described above is used in positions on the apparatus in which the positioning fences 37 and 41 are absent. The module may be modified, as shown in FIG. 8, by removing the anvil and arm 62 and 63, so that the fences 37 and 41 may be used as anvils against which the fastener mechanism may operate.

Figure 9:
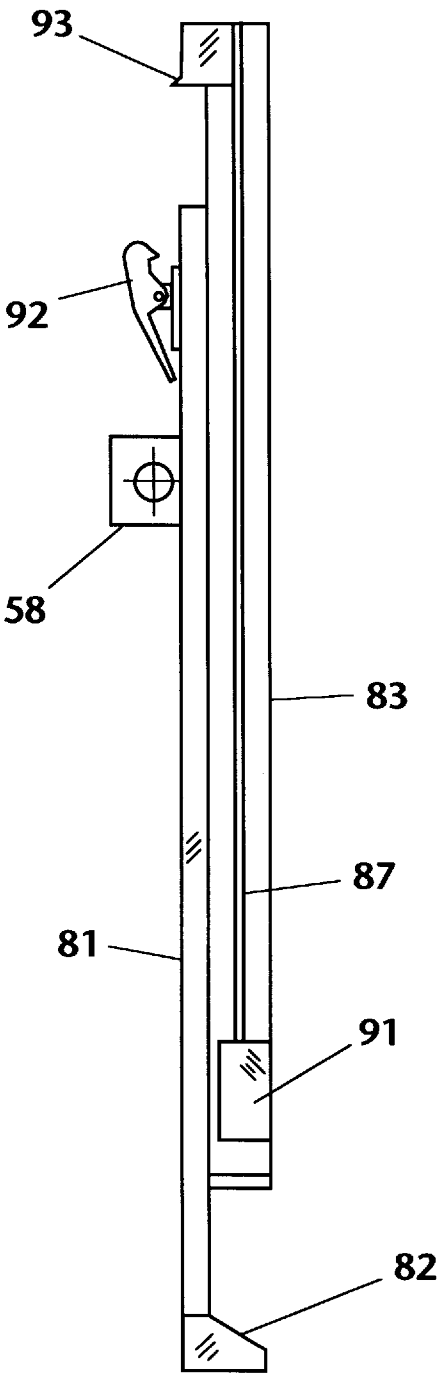
FIG. 9 is a plan elevation of the magazine portion of the module, shown in a partially opened disposition.
Figure 10:
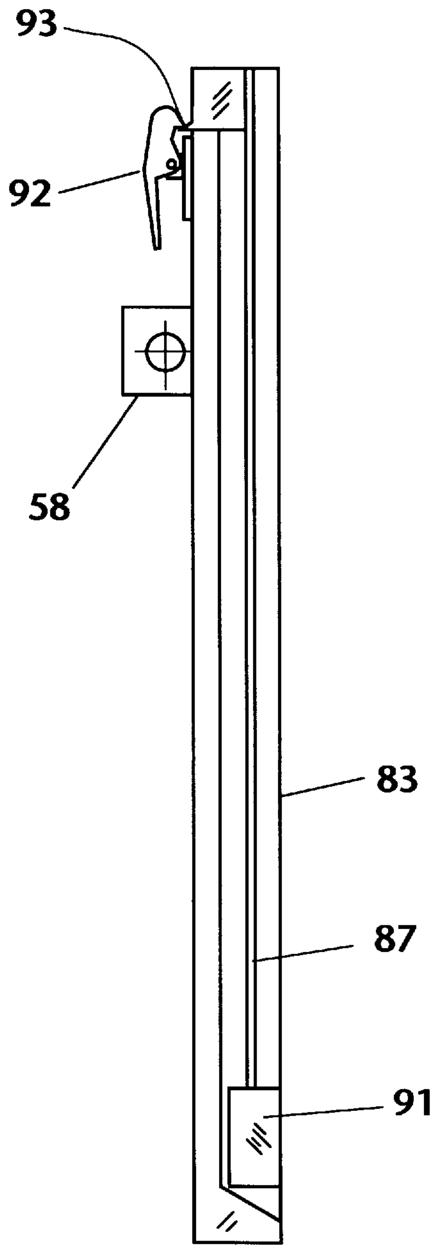
FIG. 10 is a plan elevation of the magazine portion of the module, shown in a fully closed disposition.
Figure 11:
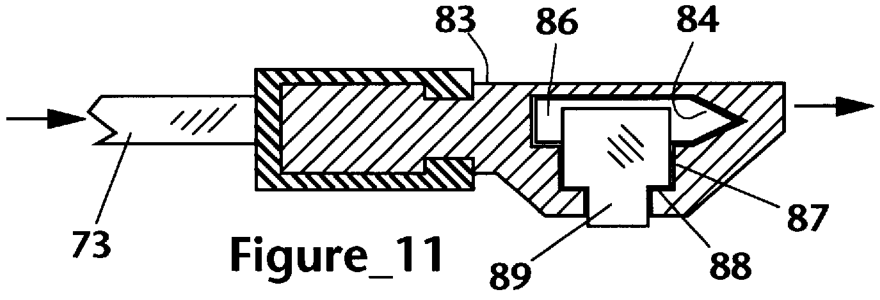
FIG. 11 is an enlarged cross-sectional view of the magazine portion of the module of the invention.
Figure 12:
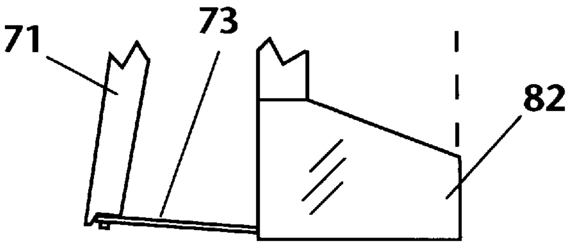
FIG. 12 is an enlarged partial elevation of the magazine depicting the foot portion of the magazine and the fastener driver blade assembly.
Figure 13:
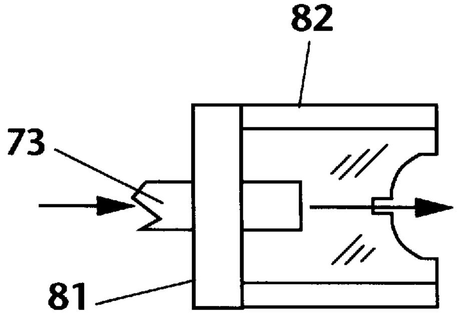
FIG. 13 is an enlarged partial side view of the foot portion of the magazine.

With regard to FIGS. 9–13, the magazine is comprised of a strut 81 that is provided with a channel-like configuration, with the journal 58 extending from the outer surface of the channel. A foot portion 82 is formed at the lower end of the strut 81, and the fastener driver blade 73 extends into the foot portion, as shown in FIGS. 12 and 13. The magazine further includes a longitudinal member 83 that is slidably secured in the channel portion of the strut 81, as shown in FIGS. 9 and 10. An interior chamber 84 extends longitudinally the length of the member 83, and is provided with a cross-sectional configuration that accommodates the plan dimensions of the fasteners 86 used to secure the frame backing. The chamber is thus configured to store a large plurality of fasteners 86 in a vertically stacked column, with the pointed ends of the fasteners oriented toward the ejection direction. The lower end of the column is disposed in the foot portion of the strut 81 and the lowermost fastener of the column is engageable by the driver blade 73 to be ejected and driven into the picture frame.

The member 83 further includes a slot 87 disposed longitudinally therein and extending from the exterior surface to the interior chamber 86. The slot 87 includes a stepped opening 88 to retain a feed slide 89 which engages the upper end of the column of fasteners 86. The feed slide 89 is connected to a spring feed mechanism 91 to exert a downward force on the column of fasteners, so that a new fastener 86 is urged into position to be engaged by the driver blade 73 at the end of each fastener dispensing cycle. The chamber 84 is generally filled from the open upper end thereof. A latch 92 secured to the upper end of the strut 81 is disposed to engage a detent 93 extending from the upper end of the member 83, so that the components 81 and 83 are secured together as shown in FIG. 10. The latch 92 may be released manually to slide the member 83 upwardly in the channel portion of strut 81, as shown in FIG. 9, to clear any jam or correct a feed malfunction.

Figure 4:
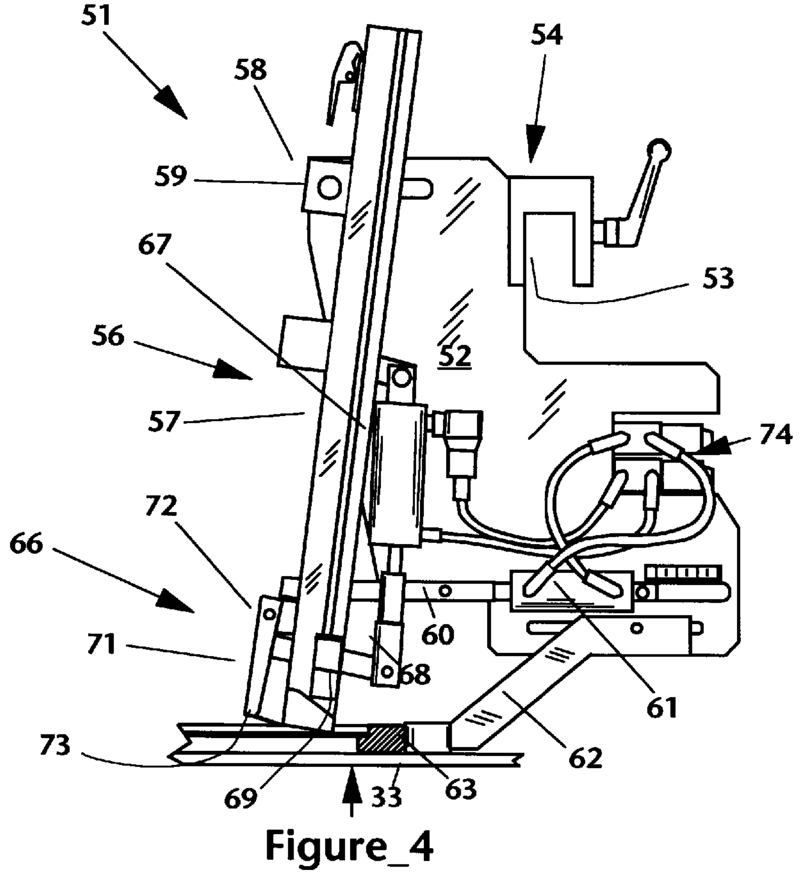
FIG. 4 is a plan elevation as in FIG. 3, showing the table of the apparatus raised to position a picture frame in working relationship to the module.
Figure 5:
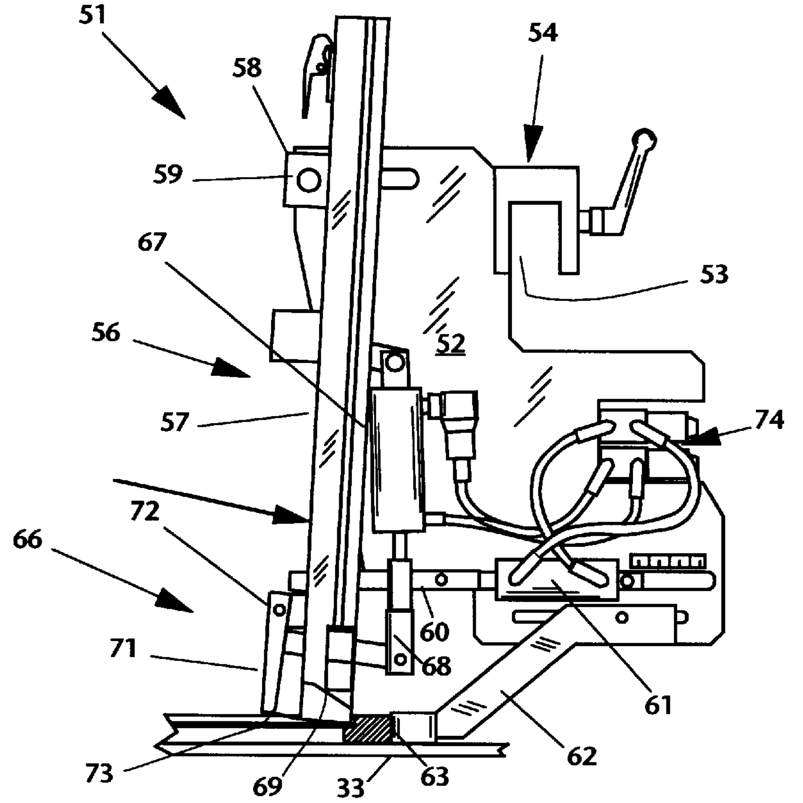
FIG. 5 is a plan elevation as in FIG. 4, showing the magazine of the module rotated to clamp the picture frame to the anvil of the module.
Figure 6:
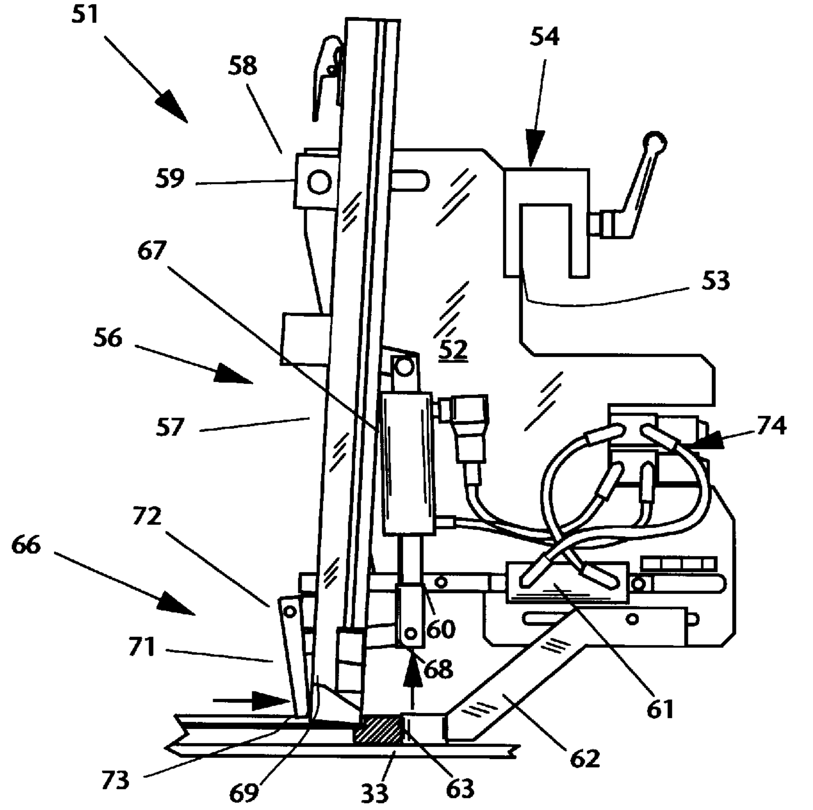
FIG. 6 is a plan elevation as in FIG. 5, showing the fastener driver assembly activated to place a fastener into the interior surface of the clamped picture frame.

The method of the invention involves, in its broadest aspect, the use of the apparatus described above for finish assembly of picture frames. A picture frame 95 is placed on the table 33 and properly positioned for work by the fences 37 and 41, as shown in FIGS. 1 and 8. The table is then elevated by pneumatic actuator 36, as shown in FIGS. 2 and 4, so that the frame rails are disposed between the anvils 63 and feet 82 of the modules 51. Pneumatic actuator 61 is then activated to rotate the magazine assembly 56 and clamp the frame rail between the foot 82 and anvil 63 (or fences 37 or 41) of each module (FIG. 5). Actuator 61 remains activated while actuator 67 is operated to rotate the drive lever 71 and cause the driver blade 73 to eject a fastener from the bottom of the column of fasteners in member 83.

Figure 7:
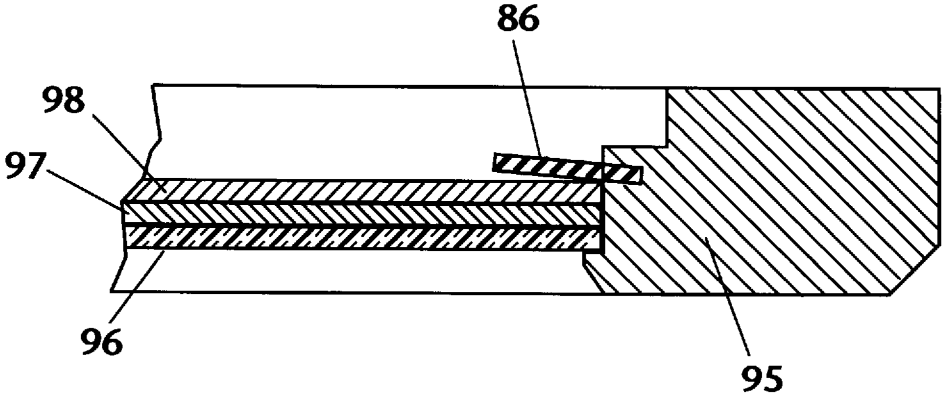
FIG. 7 is an partial cross-sectional elevation of a picture frame with a fastener placed therein by the apparatus of the invention.

Actuator 67 is retracted to retract the drive blade and permit the feed slide 89 to advance a new fastener 86 into position to be dispensed in a subsequent cycle. Actuator 61 is then retracted to release the clamping action on the frame, and actuator 36 is retracted to lower the table 33. Actuator 42 is then activated and retracted to push the finished frame off the table 33, clearing the way for the initiation of another frame finishing cycle. The cycle described may be carried out in as little time as one second, due in large part to the fact that all modules 51 are actuated simultaneously to install fasteners in the frame. The finished frame (FIG. 7) thus includes glazing 96 and artwork 97 held within the frame 95 by backing 98, which is lodged in the frame by the tails of fasteners 86 impinging on the backing 98.

Figure 14:
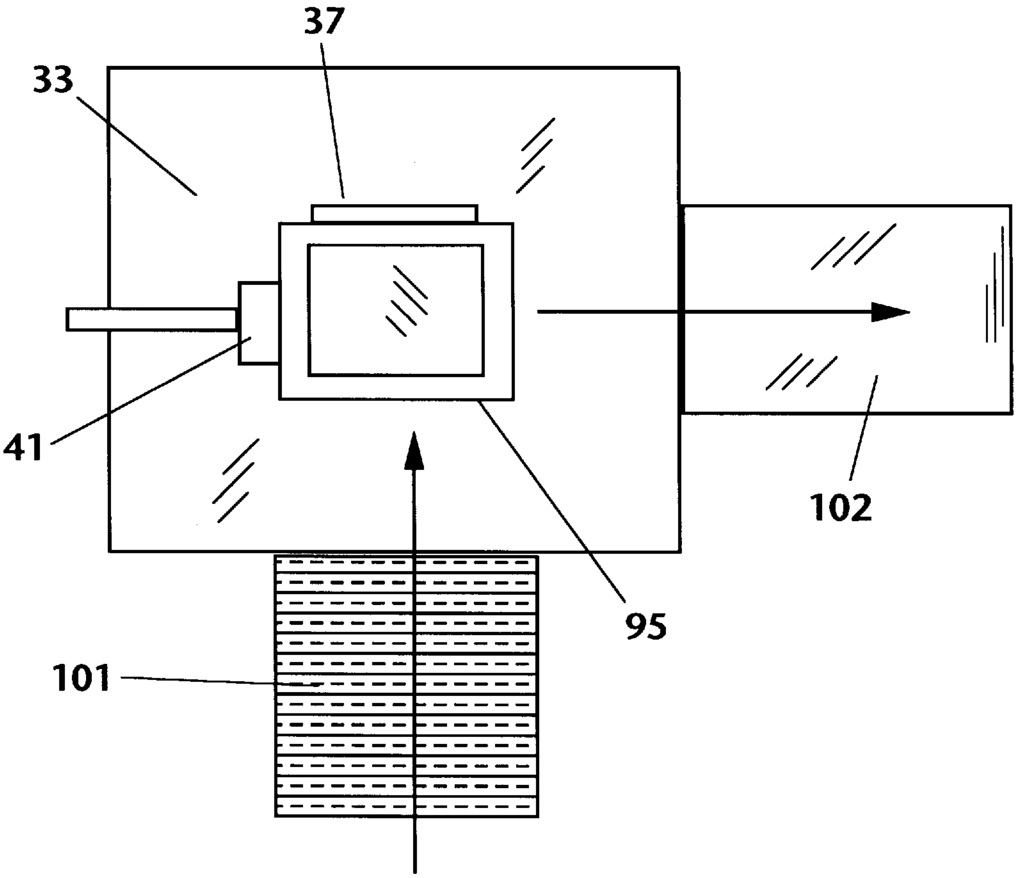
FIG. 14 is a plan view of a further embodiment of the invention for automatically supplying and removing frames from the table of the apparatus.
Figure 15:
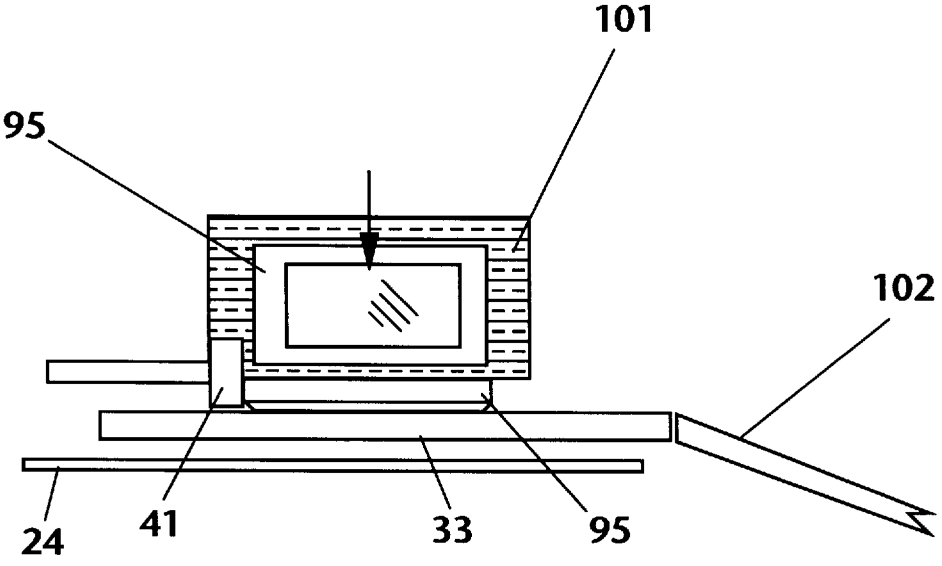
FIG. 15 is front elevation of the embodiment shown in FIG. 14.

A further aspect of the method of the invention, as shown in FIGS. 14 and 15, includes the automation of the process described above. A conveyor belt 101, chute, or similar article moving device is located adjacent to the apparatus 21 and disposed to deliver picture frames 95 serially and sequentially to the table 33. The conveyor 101 is operated periodically in response to the completion of a frame finishing cycle, as described above, to load an unfinished picture frame onto the table 33 as needed. In addition, a ramp 102 extends downwardly from a position adjacent to the table to receive the frames 95 as they are finished and ejected by the ejector fence 41. By operating the conveyor 101 in synchronism with the apparatus 21 and modules 51, the method may be practiced as a continual reiteration of the frame finishing cycle described above, and production of high quality picture frames may proceed at a very rapid pace.

Figure 16:
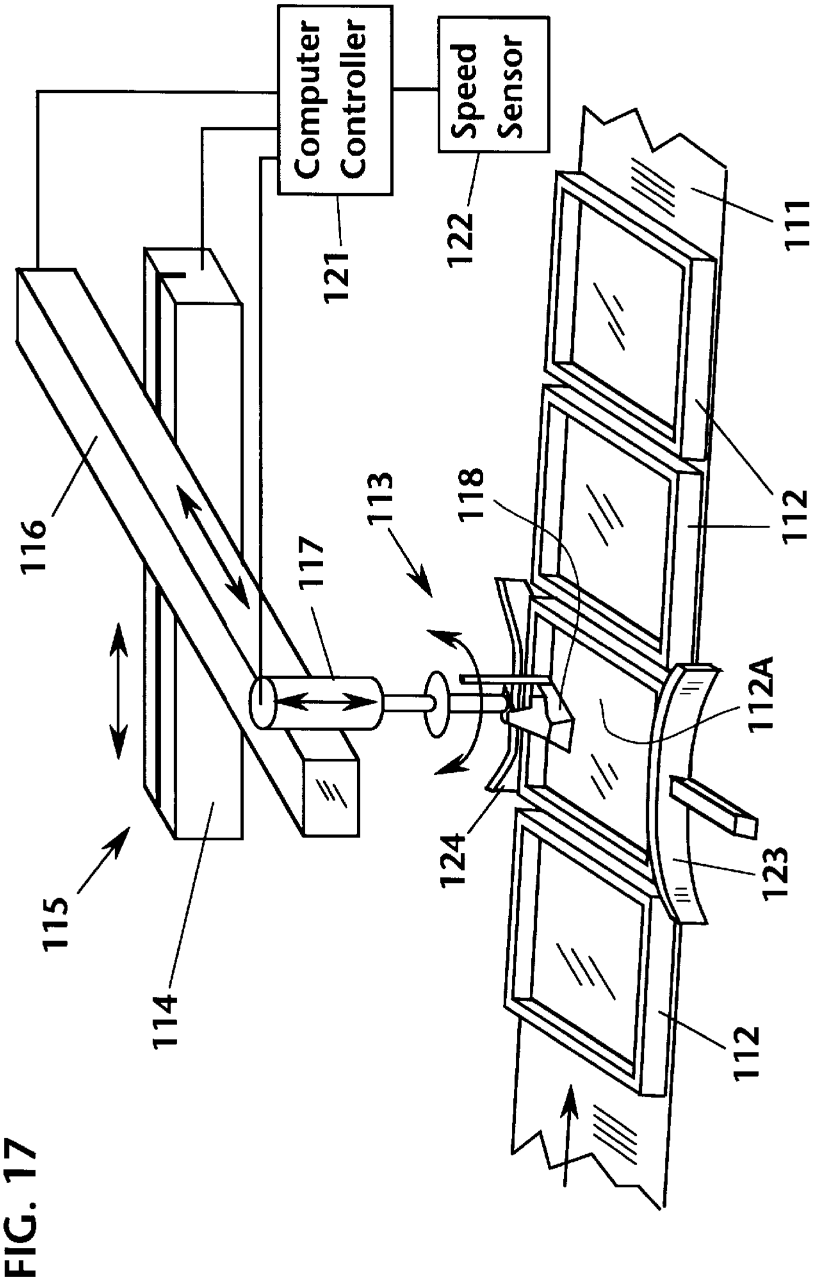
FIG. 16 is a perspective view of a further embodiment of the invention.
Figure 17:
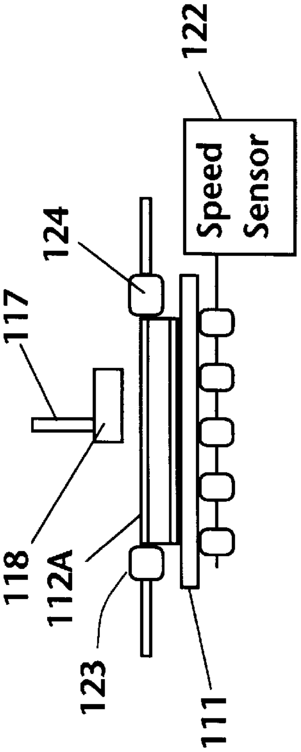
FIG. 17 is a cross-sectional end view of the conveyor system at the fastener applying station of the embodiment of FIG. 16.

A further embodiment of the invention, depicted in FIGS. 16 and 17, provides a conveyor belt 11 1 for supporting a plurality of picture frames 112 disposed with the backing thereof facing upwardly. The conveyor belt 111 translates the frames 112 past a fastener applying station 113 which secures the backing and artwork in the frames. The fastener applying station 113 includes a robot arm assembly 115 that comprises an X axis translating actuation 114, a Y axis translating actuator 116, and a Z axis motive actuator 117 that provides translation in and rotation about the Z axis. A module 118 for installing tabs or like fasteners as described above with reference to FIG. 8 is supported by the motive assembly 117, whereby the single module 118 may be moved by the robot arm assembly 115 to engage the frames on the conveyor belt as they pass the fastener applying station 113.

The robot arm assembly 115 is operatively connected to a computer control system 121 which is programmed to operate the robot arm assembly 115 so that the fastener module 118 engages each frame 112 as it passes the station 113, drives the fasteners into the rails of each frame to secure the artwork therein, and moves to engage the next frame presented by the conveyor 111, The computer control system 121 is connected to a conveyor speed sensor 122, the signal therefrom being used by the control system to drive the robot arm assembly 115 to translate the fastener module 118 in synchronism with each frame 112, whereby the fastener module may be operated within each passing frame 112A without requiring changing the speed of the computer to effect installation of the fasteners in the rails of each frame.

The fastener applying station 113 further includes a pair of side guides 124 disposed at laterally opposed sides of the conveyor 111 in adjustable fashion to positively determine the path of the frame 112A through the station 113. Moreover, the side guides 124 impinge on the longitudinally extending rails of the frame 112A to absorb the reaction force applied by the fastener module 118 as it drives the fasteners into those rails. The frames 112 may be abutted on the conveyor 111, whereby the reaction force on the laterally extending rails is absorbed by the inertial mass and friction of the frames disposed upstream and downstream of the fastener applying station 113. Dunn Patent Application Apparatus for Applying Fasteners to Picture Frames Page 17

Claims:

1. An apparatus for driving fasteners in a frame, including;

a fastener driver module;

a robot arm assembly;

a panel for supporting the components of said module;

a cutout formed in said panel for suspending said module from said robot arm assembly;

a magazine including an interior chamber adapted to store a plurality of said fasteners in stacked column fashion;

means for securing one end of said magazine in rotatably fashion to said panel;

first actuator means mounted on said panel for pivoting the other end of said magazine into engagement with a portion of the frame;

a drive lever pivotally secured at one end to said magazine, and a driver blade extending from the other end of said drive lever, said drive lever extending through said other end of said magazine;

second actuator means mounted on said magazine and coupled to said drive lever to rotate said drive lever reciprocally and translate said driver blade reciprocally to engage the endmost fastener in said column of fasteners and drive the endmost fastener into the frame.

2. The apparatus of claim 1, further including conveyor means for supporting a plurality of the frames and translating the frames singly and serially past said robot arm assembly.

3. The apparatus of claim 2, further including computer control means operatively connected to said robot arm assembly, said computer control means including program means to drive said robot arm assembly to engage each of the frames supported on said conveyor means and operate said fastener driver module to drive fasteners into each of the frames to secure the backing and artwork therein.

4. The apparatus of claim 3, further including speed sensor means coupled to said conveyor means to generate a speed signal, said computer control means receiving said speed control means, said program means driving said robot arm assembly in translational synchronism with each of the frames translating past said robot arm assembly.

5. An apparatus for applying fasteners to a plurality of art frames to secure an artwork in each art frame, including:

a fastener driver module;

robot arm means for supporting and moving said fastener driver module;

conveyor means for supporting the plurality of art frames and translating the art frames singly and serially past said robot arm means;

computer control means operatively connected to said robot arm means, said computer control means including program means to drive said robot arm means to engage each of the frames supported on said conveyor means and operate said fastener driver module to drive fasteners into each of the frames to secure the artwork therein.

6. The apparatus of claim 5, further including speed sensor means coupled to said conveyor means to generate a speed signal, said computer control means receiving said speed control means, said program means driving said robot arm means in translational synchronism with each of the frames translating past said robot arm means.

7. The apparatus of claim 6, further including side guide means adjacent to said robot arm means for impinging on each of the plurality of art frames and absorbing reaction forces applied to each of the art frames as said fastener driver module drives fasteners into each of the art frames.

* * * * *